United States Patent [19]

Darcangelo et al.

[11] Patent Number: 4,514,205
[45] Date of Patent: Apr. 30, 1985

[54] FIBER COOLING APPARATUS

[75] Inventors: Charles M. Darcangelo, Corning; Max R. Montierth, Elmira, both of N.Y.; Yang-Chou M. Ni, Lexington, Ky.

[73] Assignee: Corning Glass Works, Corning, N.Y.

[21] Appl. No.: 587,816

[22] Filed: Mar. 9, 1984

Related U.S. Application Data

[63] Continuation of Ser. No. 318,374, Nov. 5, 1981.

[51] Int. Cl.³ ............................................ C03B 37/025
[52] U.S. Cl. .......................................... 65/12; 65/13; 65/158
[58] Field of Search ................... 65/2, 3.11, 12, 13, 65/29, 32, 157, 158, 160, 163; 427/163, 398.4, 398.5; 118/65, 69; 264/237, 1.5, 348, 1.6

[56] References Cited

U.S. PATENT DOCUMENTS

| | | | |
|---|---|---|---|
| 3,540,870 | 11/1970 | Li | 65/32 |
| 4,030,901 | 6/1977 | Kaiser | 65/13 |
| 4,126,436 | 1/1978 | Bailey | 65/13 |
| 4,309,201 | 1/1982 | Klop et al. | 65/12 |
| 4,400,190 | 8/1983 | Briere | 65/2 |
| 4,437,870 | 3/1984 | Miller | 65/157 |

FOREIGN PATENT DOCUMENTS 560841   6/1977   U.S.S.R. ..................... 65/13

Primary Examiner—S. Leon Bashore
Assistant Examiner—Michael K. Boyer
Attorney, Agent, or Firm—W. J. Simmons, Jr.

[57] ABSTRACT

Disclosed is an optical waveguide fiber coating system having means for cooling the hot fiber prior to the time that the fiber enters the coating apparatus. The cooling means comprises an elongated coolant tube through which the fiber passes. Cool dry helium is flowed into that end of the coolant tube into which the fiber enters. In a preferred embodiment, the coolant tube is surrounding by a chamber containing a liquified gas. The helium is cooled by flowing through a coil submerged in the liquified gas prior to being flowed into the tube. An iris diaphragm located at the fiber input end of the coolant tube prevents the entry of moist, warm air into that tube.

7 Claims, 3 Drawing Figures

FIBER COOLING APPARATUS

This is a continuation of application Ser. No. 318,374, filed Nov. 5, 1981.

CROSS-REFERENCE TO RELATED APPLICATION

This application is related to U.S. patent application Ser. No. 318,375 entitled "Optical Waveguide Fiber Cooler" filed on Nov. 5, 1981.

BACKGROUND OF THE INVENTION

Glass optical waveguide fibers are remarkably strong as they are drawn, but their strength is greatly affected by physical handling. They must therefore be coated with a protective material before they come in contact with the fiber drawing tractors. For a number of reasons including improved diameter control and cleanliness, the tractors should be as close as possible to the draw furnace. At a fixed distance from the furnace, the fiber becomes hotter at higher draw rates. Thus, to cool a fiber by natural cooling, longer distances are required for higher draw rates. For example, to cool a 125 μm diameter fiber from 1780° C. to a temperature needed to apply a cellulose acetate lacquer solution with acetone, approximately 80 cm of cooling distance is required for a draw speed of 0.5 m/sec. A distance of 120 cm is required to cool that fiber to 50° C. at a draw rate of 0.75 m/sec., and 800 cm is required if the draw rate is 5 m/sec.

The economical production of large quantities of optical waveguide fibers will undoubtedly require fiber drawing speeds greater than 1 m/sec. As fiber drawing speeds approach 1 m/sec., presently constituted fiber drawing systems do not afford sufficient time for the fiber to cool by natural processes to temperatures which are compatible with application techniques employing presently developed waveguide coating materials. When the temperature of the fiber is too high, the coating may become too thin or discontinuous. If the coating is applied from a 100% solids solution, the hot fiber can cause the coating material to set up in the coating apparatus around the fiber, thus preventing any further coating material from being applied to the fiber.

The optical waveguide fiber coating system disclosed in U.S. Pat. No. 4,208,200 employs means for cooling the hot fiber prior to its entering the coating apparatus. The cooling means comprises an elongated, liquid filled container through which the fiber passes. The bottom of the container is provided with a felt wiping die which seals the container and removes excess liquid from the fiber. This type of fiber cooling device has a number of disadvantages. At high draw rates the fiber can become so hot that it boils the liquid. This causes turbulence which can move the fiber laterally so that it is displaced from its proper position in the diameter measuring device. Also, the wiping means physically contacts the fiber, a factor which might adversely affect fiber strength.

SUMMARY OF THE INVENTION

It is therefore an object of the present invention to provide an apparatus for coating glass optical fibers that are drawn at relatively high drawing speeds. A further object is to provide an apparatus for cooling a glass optical fiber to a temperature that is not detrimental to the coating material prior to that time it reaches the coating tank.

Briefly, the present invention relates to a fiber drawing apparatus comprising a source of softened glass from which a fiber is drawn, means for cooling the fiber, and means for applying a protective coating to the fiber. The means for cooling is characterized in that it comprises an elongated coolant tube surrounding the fiber, a source of coolant gas and means for cooling the coolant gas. Means are provided for flowing the cooled coolant gas into the coolant tube.

In a preferred embodiment the coolant gas is helium and the cooling means comprises a reservoir in which the coolant tube is centrally located. A tubular coil, which is disposed in the reservoir, is submerged in a liquified gas. A source of helium is connected to the tubular coil to the coolant tube.

DETAILED DESCRIPTION

It is to be noted that the drawings are illustrative and symbolic of the present invention and that there is no intention to indicate the scale or relative proportions of the elements shown therein.

Figures 1, 3:
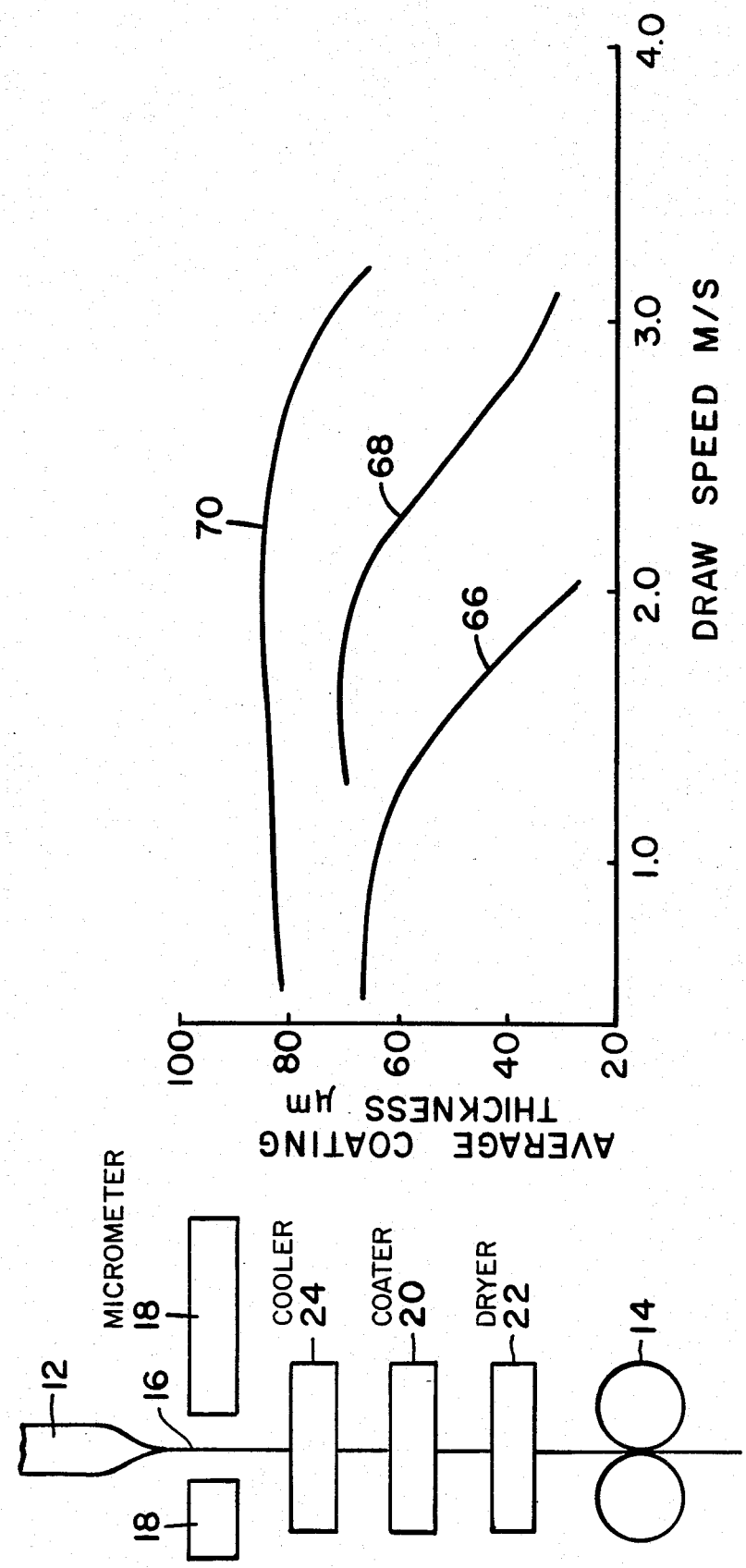
FIG. 1 is a schematic illustration in block diagram form of an optical fiber drawing system.
FIG. 3 is a graph illustrating the decrease in fiber coating thickness with increased drawing rate. This graph also illustrates the beneficial affect of fiber cooling.

The conventional fiber drawing system shown in FIG. 1 comprises a solid mass of glass or preform 12 at least the tip of which is molten, and a pair of tractors 14 for drawing fiber 16 from the molten glass. The softened or molten portion of the preform which tapers from the preform diameter to the fiber diameter is often referred to as the fiber root or neckdown region. The output of optical micrometer 18 is coupled to a control system which regulates the speed of tractors 14 to control the diameter of the fiber. Fiber 16 passes through a coater 20 which applies a protective material thereto, and thereafter, it may pass through a dryer or curing unit 22. At high draw rates it is desirable to employ means 24 to cool the fiber to a temperature which does not detrimentally affect the coating material applied at coater 20.

Figure 2:
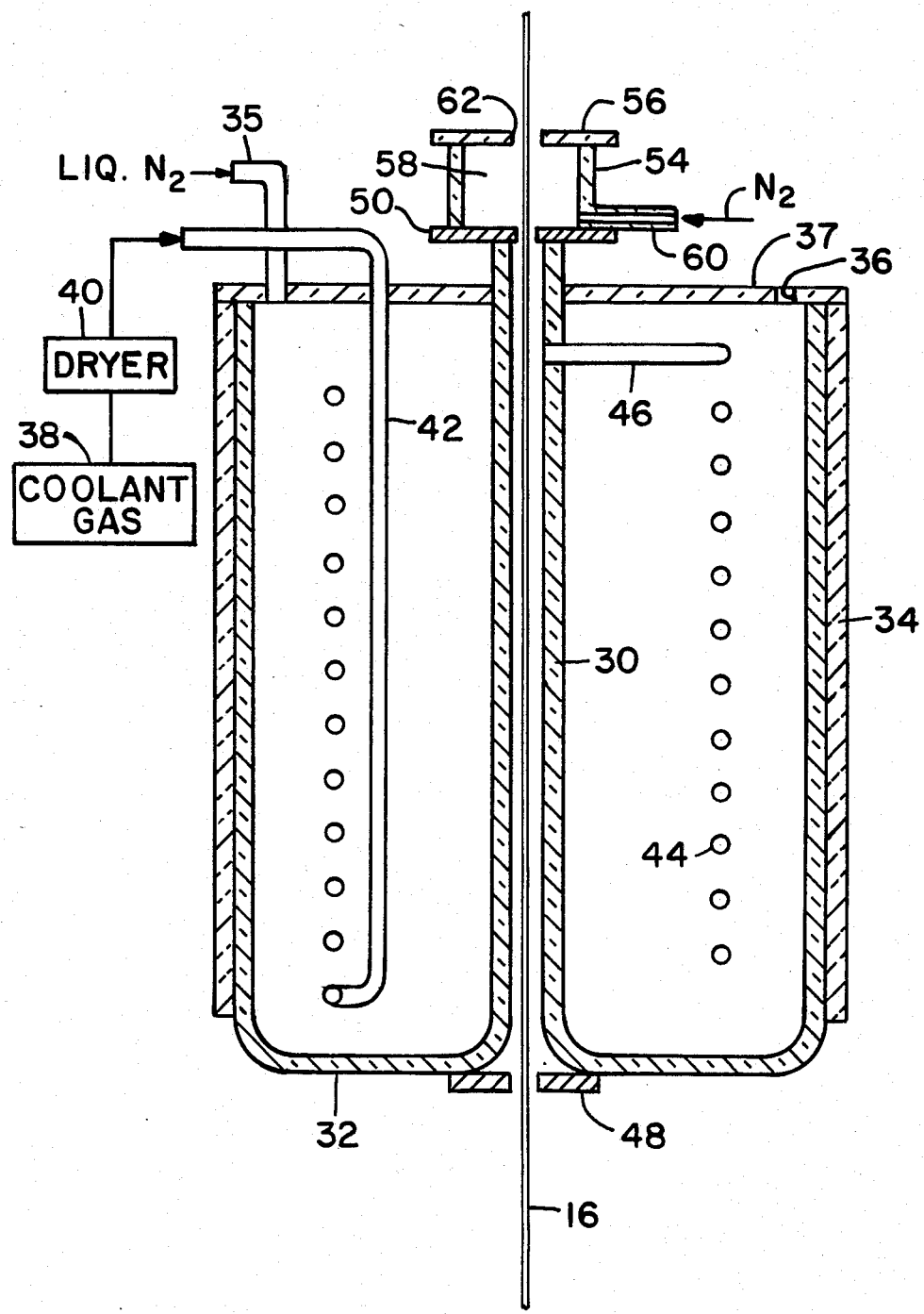
FIG. 2 is a cross-sectional view of the fiber cooling apparatus of the present invention.

The improved fiber cooling means of the present invention is illustrated in FIG. 2. Fiber 16 is drawn through a cylindrical tube 30 which is situated in the center of reservoir 32 which contains a liquified gas such as nitrogen, oxygen, argon or the like. Tube 30 and reservoir 32 may be formed of a low expansion glass, stainless steel, copper or the like. An insulating sleeve 34 surrounds reservoir 32. If the system is to be used for several hours, additional liquified gas should be added to reservoir 32 by pipe 35. Gas is vented from the reservoir through opening 36 in cover 37. A coolant gas source 38 of helium, carbon dioxide or the like is connected by a dryer 40 to a copper tube 42 which is connected to the bottom of a coil 44 of copper tubing. Helium is preferred because of its high heat transfer coefficient. The top of coil 44 is connected by a section of copper tubing 46 to tube 30. Since coil 44 is immersed in a liquified gas, the helium flowing therethrough is cooled prior to flowing into tube 30.

Iris diaphragms 48 and 50 are situated at the two ends of tube 30 to restrict the flow of helium therefrom. The iris diaphragms, which are commercially available, can be initially adjusted to provide a relatively large opening until the drawing process achieves steady state conditions. Diaphragms 48 and 50 can then be adjusted to provide relatively narrow openings to restrict the flow of helium from tube 30.

The upper end of tube 30 may be provided with a gas lock for preventing the flow of moist ambient air therein. The gas lock may comprise a cylinder 54 which, together with cover 56 and iris diaphragm 50, forms a chamber 58. A dry, cool inert gas such as nitrogen may be flowed into chamber 58 through a tube 60. The flow of inert gas into chamber 58 is adjusted so that a small amount flows upward through orifice 62, thereby preventing the flow of ambient air into chamber 58. Some of the dry nitrogen can flow from chamber 58 into tube 30.

During the drawing operation, coolant gas cooled in reservoir 32 flows into the top of coolant tube 30 where it flows throughout the length thereof to cool the fiber by forced convection. Since tube 30 is surrounded by liquified gas, coolant gas flowing in tube 30 is cooled by liquid nitrogen through the wall of tube 30.

The following specific example illustrates the advantages of the apparatus of the present invention. A 25 mm diameter borosilicate glass tube having an inside diameter of 22 mm was flameworked to the bottom of a borosilicate glass beaker. A 15.2 cm diameter coil of 2.4 mm ID copper tubing having twenty turns was placed around the center tube and connected to the top thereof as shown in FIG. 2. The beaker was placed in a stainless steel can to provide the glass with protection from breakage. An iris diaphragm was located on the top of the center tube. The lower iris diaphragm 48 and the upper gas lock of FIG. 2 were omitted. The beaker was filled with an amount of liquid nitrogen sufficient to cover the copper tubing coil. The fiber cooler was mounted on a fiber draw apparatus in the manner illustrated in FIG. 1. The top of the fiber cooler was 36.8 cm below the furnace and a pressure coater was mounted 231 cm below the furnace. A blank 12 of fused silica was mounted in the furnace and the draw speed was regulated so that a 140 $\mu$m diameter fiber was drawn. The coater was provided with a 0.41 mm die. An ultraviolet-curable acrylate coating known as DeSoto 950×037 (manufactured by DeSoto Inc., 1700 S. Mt. Prospect Road, Des Plaines, Ill.) was supplied to the coater where it was applied to the fiber in a thickness of about 65-70 $\mu$m. The coating material was cured by ultraviolet lamps located below the coater. Gas flows to the cooler were determined by a regulator mounted flowmeter. Fiber samples were taken at every 0.1 m/sec. change in draw rate for coating thickness measurements. Baseline data were gathered by using the basic set-up without activating the fiber cooler. Curve 66 of FIG. 3 illustrates the manner in which coating thickness decreased as fiber draw rate was increased when no helium was flowed into tube 30. The coating thickness remained essentially constant at about 65 $\mu$m until the draw speed reached about 1.0 m/sec. At higher draw speeds, the coating thickness fell off precipitously.

With the cooler filled with liquid nitrogen and a helium flow rate of about 0.85 m$^3$/hr., the coating thickness did not begin to decrease until the draw rate reached about 1.8 m/sec. as illustrated by curve 68. When the helium flow rate was increased to about 3.54 m$^3$/hr., no decrease in coating thickness was manifested until the draw speed reached about 2.4 m/sec. as illustrated by curve 70. The coating thickness for this latter mentioned run was about 83 $\mu$m because a different die was employed in the coater.

We claim:

1. In an apparatus for drawing a single optical fiber comprising, in order of relative location:
    a solid glass preform having at one end thereof a softened root portion wherein the preform cross-sectional area tapers to the cross-sectional area of said single fiber,
    means situated along said fiber below said root portion for measuring the diameter of said fiber,
    means for cooling said fiber,
    means for applying protective coating material to said fiber, and
    means for drawing said fiber, characterized in that said means for cooling comprises
    an elongated tube surrounding said fiber, the top of said tube being below said diameter measuring means,
    means supplying coolant gas,
    a reservoir in which said tube is centrally disposed, said reservoir containing liquified gas,
    means for cooling said coolant gas prior to the time that said coolant gas reaches said tube, and
    means for flowing said cooled coolant gas through said tube and axially along that portion of said fiber within said tube whereby said fiber is cooled to a temperature that is sufficiently low that said fiber does not adversely affect said protective coating material.

2. An apparatus in accordance with claim 1 further comprising a first iris diaphragm at that end of said tube into which said fiber enters for providing said tube with a variable fiber entrance aperture.

3. An apparatus in accordance with claim 2 wherein said reservoir comprises a reservoir containing liquified gas selected from the group consisting of liquid nitrogen, oxygen and argon.

4. An apparatus in accordance with claim 3 further comprising a second iris diaphragm located at that end of said tube from which said fiber emerges.

5. An apparatus in accordance with claim 4 further comprising means adjacent said first iris diaphragm for forming a gas lock chamber through which said fiber passes, and means for flowing an inert gas into said chamber.

6. An apparatus in accordance with claim wherein said means for flowing is located at that end of said tube into which said fiber enters.

7. An apparatus in accordance with claim 1 wherein said means for cooling said coolant gas comprises a tubular coil disposed in said reservoir and immersed in said liquified gas, said means suppling coolant gas being connected by said coil to said tube, whereby said gas is cooled prior to reaching said tube.

* * * * *